United States Patent
Clifton et al.

(10) Patent No.: US 9,386,103 B2
(45) Date of Patent: Jul. 5, 2016

(54) APPLICATION IDENTIFICATION AND DYNAMIC SIGNATURE GENERATION FOR MANAGING NETWORK COMMUNICATIONS

(71) Applicant: BreakingPoint Systems, Inc., Austin, TX (US)

(72) Inventors: Ryan S. Clifton, Austin, TX (US); Alexander I. Tomlinson, Austin, TX (US); Deep Datta, Austin, TX (US); Jeremy B. Moss, Austin, TX (US); Dennis J. Cox, Austin, TX (US)

(73) Assignee: BreakingPoint Systems, Inc., Austin, TX (US)

( * ) Notice: Subject to any disclaimer, the term of this patent is extended or adjusted under 35 U.S.C. 154(b) by 342 days.

(21) Appl. No.: 14/045,952

(22) Filed: Oct. 4, 2013

(65) Prior Publication Data
US 2015/0101043 A1  Apr. 9, 2015

(51) Int. Cl.
*H04L 29/06* (2006.01)
*H04L 29/08* (2006.01)

(52) U.S. Cl.
CPC ...................... *H04L 67/14* (2013.01)

(58) Field of Classification Search
CPC ....................................... H04L 67/14
See application file for complete search history.

(56) References Cited

U.S. PATENT DOCUMENTS

| | | | |
|---|---|---|---|
| 7,239,639 B2 | 7/2007 | Cox et al. | |
| 7,620,807 B1 | 11/2009 | Spatscheck et al. | |
| 7,633,868 B2 | 12/2009 | Buckman et al. | |
| 7,644,150 B1 * | 1/2010 | Nucci et al. | 709/223 |
| 7,773,516 B2 | 8/2010 | Cox et al. | |
| 7,904,555 B2 | 3/2011 | Nooner et al. | |
| 7,996,520 B2 | 8/2011 | Weil et al. | |
| 8,149,826 B2 | 4/2012 | Marcondes et al. | |
| 8,296,178 B2 | 10/2012 | Hudis et al. | |
| 8,347,375 B2 | 1/2013 | Graham et al. | |

(Continued)

FOREIGN PATENT DOCUMENTS

| | | |
|---|---|---|
| EP | 1715624 | 10/2006 |
| WO | 2005/114947 | 12/2005 |

(Continued)

*Primary Examiner* — Brandon Hoffman
*Assistant Examiner* — Thong Truong
(74) *Attorney, Agent, or Firm* — Egan, Peterman, Enders & Huston LLP.

(57) ABSTRACT

Systems and methods are disclosed for application identification and dynamic signature generation for managing network communication systems. Communication sessions and related packet flows are monitored within a network communication system. Application level information is extracted from session packets by unpacking one or more communication protocols associated with the network packets to obtain application level information encapsulated within the network packets. The extracted application level information is compared to a database of known application signatures in order to identify known applications. For unknown applications, the application level information is used to generate new dynamic application signatures. The application level information can also be used to identify and access external network-accessible resources to obtain additional identification information for the unknown application. Identification information for the newly detected application can then be provided to a user along with flow control options for the newly detected application.

28 Claims, 6 Drawing Sheets

(56) References Cited

U.S. PATENT DOCUMENTS

| | | | |
|---|---|---|---|
| 8,352,630 B2 * | 1/2013 | Hart | 709/232 |
| 8,365,272 B2 | 1/2013 | Touboul | |
| 8,375,444 B2 | 2/2013 | Aziz et al. | |
| 8,402,540 B2 | 3/2013 | Kapoor et al. | |
| 2009/0238071 A1 | 9/2009 | Ray et al. | |
| 2010/0100963 A1 * | 4/2010 | Mahaffey | 726/25 |
| 2011/0116377 A1 | 5/2011 | Batz et al. | |
| 2012/0317306 A1 | 12/2012 | Radinsky et al. | |
| 2013/0139263 A1 | 5/2013 | Beyah et al. | |

FOREIGN PATENT DOCUMENTS

| | | |
|---|---|---|
| WO | 2006/063052 | 6/2006 |
| WO | 2007/098960 | 9/2007 |
| WO | 2008/011576 | 1/2008 |
| WO | 2010/025776 | 3/2010 |
| WO | WO2011/051750 | 5/2011 |
| WO | WO2012/162102 | 11/2012 |

* cited by examiner

APPLICATION IDENTIFICATION AND DYNAMIC SIGNATURE GENERATION FOR MANAGING NETWORK COMMUNICATIONS

TECHNICAL FIELD OF THE INVENTION

This invention relates to managing network communication systems and, more particularly, to using application signatures to facilitate such network management.

BACKGROUND

Network communications often include network packet flows associated with applications running on a wide variety of network-connected devices. For example, within network communication systems, applications running on personal computers, mobile devices, and/or other processing platforms may form one or more communication connections with a variety of network-connected systems, and each of these connections can include multiple packet flows. Network management systems are often used to control various parameters associated with packet flows for applications running within a monitored network communication system, such as for example, priority of related packets, bandwidth usage, and/or other flow parameters for the network communication system. The ability to identify applications operating within the network communication system can facilitate this management of packet flows within network communication systems.

FIG. 1 (Prior Art) is block diagram of an embodiment 100 for a application signature generator for previously known applications. A new application execution module 102 runs a known application for which a signature is desired, and network transmissions 104 are generated by this known application during its operation. A packet monitor 108 collects network packets 106 associated with the operation of the known application. The parameter extractor 112 receives the collected packets 110 and processes them to extract parameters associated with lower network layers within the OSI (Open Systems Interconnect) model including: Layer 1 (L1: physical layer), Layer 2 (L2: data link layer), Layer 3 (L3: network layer), and Layer 4 (L4: transport layer). The resulting lower level data 114 from these lower level network layers (L1-L4) is then provided to application signature generator 116, which operates to generate an application signature for the known application. This new signature 118 is then stored in an application signature database 120. While such signature generation can be useful in detecting future application activity, the application must already be known for the execution module 102 to run the application and create the network transmissions used to generate a new signature for the application. As such, this technique is not particularly useful for new or unknown applications entering a network.

FIG. 2 (Prior Art) is a block diagram of an embodiment 200 for application signature generation based upon pre-classified training data. A network traffic monitor 206 monitors packets 204 from network traffic 202 and provides packet data 208 to the application signature generator 210 without regard to the state of the communications represented by the data extracted from the packets. The application signature generator 210 utilizes the stateless packet data 208 and pre-classified training data 212, which has been previously generated, to generate an application signature. While such application signature generation based upon pre-classified training data can be useful in detecting future network activity by applications, the complexity and diversity of new network applications as well as the need for pre-generated and pre-classified training data makes it difficult to detect and identify new or unknown applications entering a network.

SUMMARY OF THE INVENTION

Systems and methods are disclosed for application identification and signature generation for managing network communication systems. Communication sessions and related packet flows are monitored for devices operating within a network communication system. Application level information, as well as other desired information, is extracted from session packets by unpacking one or more communication protocols associated with the network packets to obtain application level information encapsulated within the network packets. The extracted application level information is compared to a database of known application signatures in order to identify known applications operating within the network communication system. For unknown applications, the application level information is used to generate new dynamic application signatures. The application level information can also be used to identify and access external network-accessible resources, such as for example, application websites or application stores, in order to obtain additional identification information for the unknown application. Identification information for the newly detected application can then be provided to a user along with flow control options for the newly detected application. Further, a variety of architectures can be used to store application signatures, to update application signature databases, to request generation of new application signatures, to generate new signatures, and/or to implement other desired features with respect to the embodiments described herein. Different features and variations can also be implemented, as desired, and related systems and methods can be utilized, as well.

For one embodiment, a method is disclosed for application identification and dynamic application signature generation, and the method includes receiving network packets associated with one or more flows for a network communication session, extracting application level information from the received network packets by unpacking one or more communication protocols associated with the network packets to obtain application level information encapsulated within the network packets, and determining if the extracted application level information matches known application signatures stored in a signature database. Further, if no match is found, the method further includes performing the additional steps of generating a dynamic application signature using the extracted application level information and storing the dynamic application signature in the signature database.

In other embodiments, the application level information includes OSI (Open Systems Interconnect) layer seven (L7) information. Further, the L7 information can include information from at least one of a DNS (Domain Name System) request, an SSL (Secure Socket Layer) certificate header, or an HTTP (Hyper-Text Transport Protocol) header. Still further, the communication session can include network communications between a network device and one or more servers. The method can also further include receiving application signature updates from an external source and storing the application signature updates within a signature database.

In further embodiments, if no match is found, the method further includes accessing at least one network-accessible resource to obtain additional application identification information associated with the network packets. In addition, the network-accessible resource can include at least one of an application website or an application store. Still further, the method can include providing the additional application identification information to a user interface if no match is found.

In still further embodiments, if a match is not found, the method further includes communicating the dynamic application signature to a central application signature server. In addition, the method can further include receiving an updated application signature for the dynamic application signature from the central application signature server and replacing the dynamic application signature with the updated application signature within the signature database.

In additional embodiments, if a match is found, the method further includes using flow control settings associated with the matched application signature to at least in part control the one or more flows for the communication session. In addition, if a match is not found, the method further includes obtaining flow control settings through a user interface and associating the flow control settings with the dynamic application signature.

For other embodiments, if no match is found, the method further includes communicating a signature generation request to a signature generation server, performing the generating step on the signature generation server, and receiving the dynamic application signature from the signature generation server. Further, if no match is found, the method can further include generating the dynamic application signature only if the extracted application level information includes a level of unique application information that exceeds a predetermined threshold. Still further, the known application signatures and the dynamic application signature can include a plurality of different match patterns, and each match pattern can at least in part include application level information.

For one other embodiment, a network system is disclosed for application identification and dynamic signature generation, and the network system includes a signature database configured to store application signatures, a session monitor configured to receive network packets associated with one or more flows for a network communication session, a session packet analyzer configured to unpack one or more communication protocols associated with the network packets to extract application level information encapsulated within the network packets, an application detector configured to determine if the application level information matches known application signatures stored in the signature database, a dynamic signature generator configured to generate a dynamic application signature for unknown applications using the extracted application level information, and an application signature controller configured to activate the dynamic signature generator if no match is found by the application detector and to cause the dynamic application signature generated by the dynamic signature generator to be stored in the signature database.

In other embodiments, the application level information can include OSI (Open Systems Interconnect) layer seven (L7) information. Further, the L7 information can include information from at least one of a DNS (Domain Name System) request, an SSL (Secure Socket Layer) certificate header, or an HTTP (Hyper-Text Transport Protocol) header. Still further, the application signature controller can be configured to store application signature updates received from an external source in the signature database.

In further embodiments, the network system further includes an application identification module configured to access at least one network-accessible resource to obtain additional application identification information for unknown applications. In addition, the network system can further include a user interface, and the application signature controller can be configured to provide the additional application identification information to the user interface.

In still further embodiments, the application signature controller can be configured to communicate dynamic application signatures generated by the dynamic signature generator to a central application signature server. In addition, the application signature controller can be further configured to replace dynamic application signatures stored within the signature database with updated application signatures received from the central application signature server.

In additional embodiments, the network system further includes a flow control module configured to flow control settings associated with matched application signatures to at least in part control the one or more flows for the communication session. In addition, the application signature controller can be further configured to obtain flow control settings through a user interface for unknown applications and to associate the flow control settings with the dynamic application signature.

For other embodiments, the application signature controller can be further configured to communicate a signature generation request to a signature generation server and to cause a dynamic application signature received from the signature generation server to be stored in the signature database. Further, the dynamic signature generator can be configured to generate a dynamic application signature only if the extracted application level information includes a level of unique application information that exceeds a predetermined threshold. Still further, the known application signatures and the dynamic application signature can include a plurality of different match patterns, and each match pattern can at least in part include application level information.

Different features and variations can also be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Systems and methods are disclosed for application identification and dynamic signature generation for managing network communication systems. Communication sessions and related packet flows are monitored for devices operating within a network communication system. Application level information, as well as other desired information, is extracted from session packets by unpacking one or more communication protocols associated with the network packets to obtain application level information encapsulated within the network packets. The extracted application level information is compared to a database of known application signatures in order to identify known applications operating within the network communication system. For unknown applications, the application level information is used to generate new dynamic application signatures. The application level information can also be used to identify and access external network-accessible resources, such as for example, application websites or application stores, in order to obtain additional identification information for the unknown application. Identification information for the newly detected application can then be provided to a user along with flow control options for the newly detected application. Further, a variety of architectures can be used to store application signatures, to update application signature databases, to request generation of new application signatures, to generate new signatures, and/or to implement other desired features with respect to the embodiments described herein. Different features and variations can be implemented, as desired, and related systems and methods can be utilized, as well.

Figure 1:
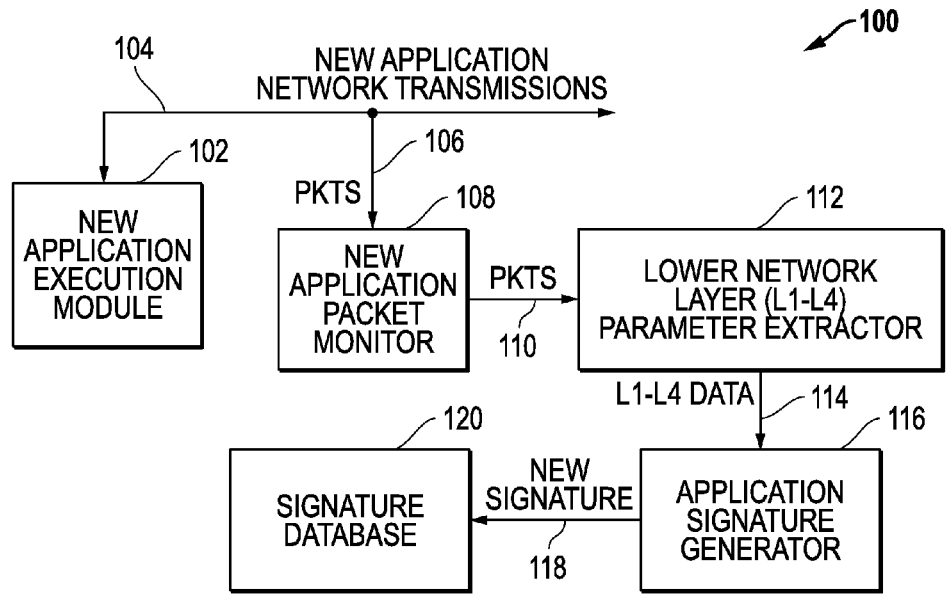
FIG. 1 (Prior Art) is block diagram of an embodiment for an application signature generator for known applications.
Figure 2:
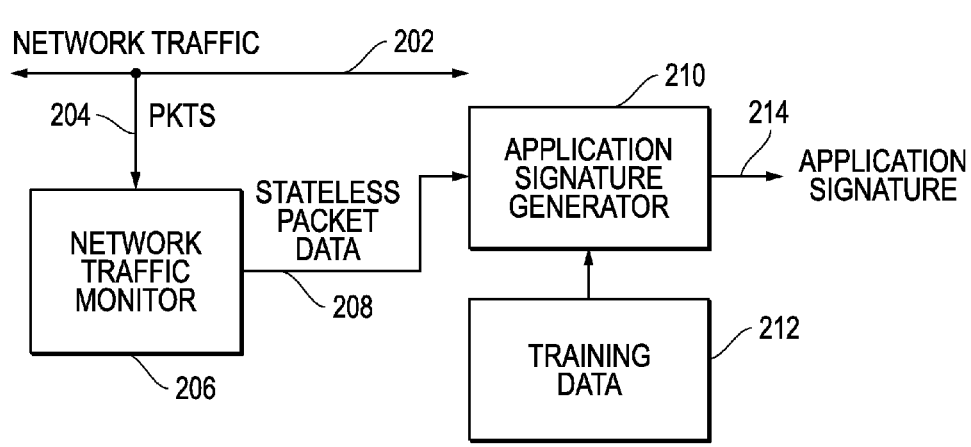
FIG. 2 (Prior Art) is a block diagram of an embodiment for application signature detection based upon pre-classified training data.
Figure 3:
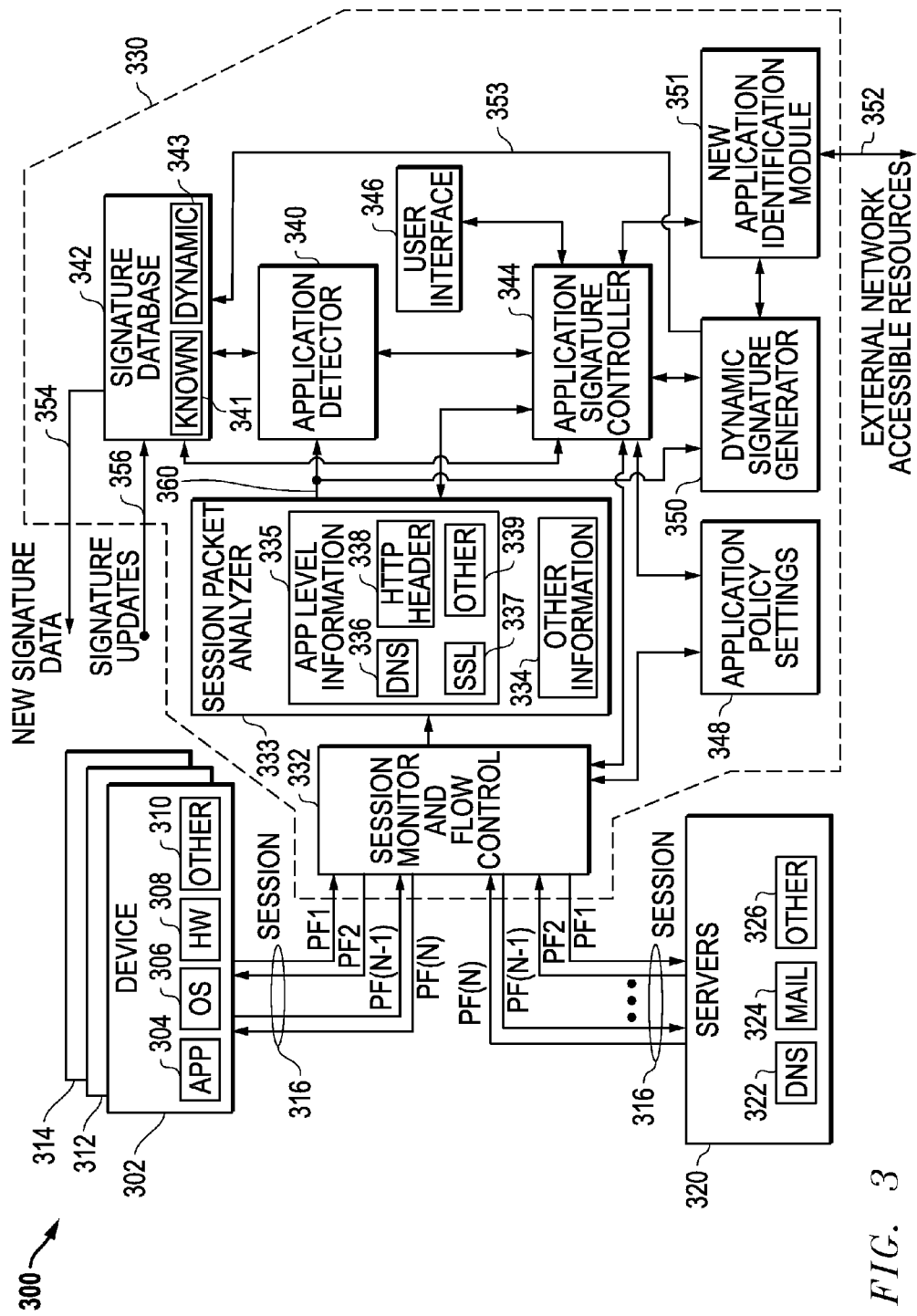
FIG. 3 is a block diagram of an embodiment that includes a network application management system that extracts application level information from monitored network packets to generate dynamic signatures for unknown applications operating within a network communication system.

FIG. 3 is a block diagram of an embodiment 300 that includes a network application management system 330 that extracts application level information 335 from monitored network packets to generate dynamic signatures for unknown applications operating within a network communication system. For the embodiment depicted, application detector 340 compares the extracted information 360, including application level information 335, from the session packet analyzer 333 to known signatures 341 within the signature database 342. If a match is found indicating that that application is known, then application identification information for the detected known application can be provided to a user through the user interface 346. If no match is found indicating that the application is unknown, the dynamic signature generator 350 then generates a dynamic application signature 353 using the extracted information 360, including the application level information 335. New application identification module 351 can also use information from the dynamic signature generator 350 and the extracted information 360, as well as information from external network-accessible resources 352, to provide meaningful application identification information 355 associated with a new application (e.g., application name) to a user through the user interface 346. The dynamic application signature 353 can be stored as a dynamic signature 343 within the signature database 342. Thus, both known signatures 341 and dynamic signatures 343 are stored and used by network application management system 330 to manage flows for communication sessions monitored within the network communication system.

For the embodiment 300 depicted, devices 302, 312, and 314 are communicating with one or more servers 320 within a network communication system. The devices 302, 312, and 314 can be any of a wide variety of devices capable of network communications, and the servers 320 can be any of a wide variety of server systems, such as for example, a DNS (Domain Name System) server 322, a mail server 324, and/or other servers 326. The servers 320 and devices 302, 312, and 314 can be part of a wide variety of different network systems and topologies, as desired, including any number of wired and/or wireless connected processing devices or servers. For example, in some embodiments, the servers 320 and devices 302, 312, and 314 can be part of a corporate intranet. In other embodiments, the devices 302, 312, and 314 can be part of a mobile cellular communication system. Other environments could also be utilized, if desired. Further, it is noted that embodiment 300 is provided as an example and a variety of additional or different servers, devices, and/or additional processing systems could be utilized, as desired.

Device 302 is shown in more detail in embodiment 300, and it is recognized that device 312 and 314 could be similarly configured. For the embodiment depicted, device 302 includes an application (APP) 304 running on an operating system (OS) 306 that are each operating on underlying hardware (HW) 308. Other hardware and/or software blocks 310 could also be included as part of device 302, and the device 302 can be running multiple different applications. For purposes of the discussion herein, it is assumed that application 304 has generated a communication session 316 including multiple forward and return packet flows (PF1, PF2 . . . PF(N−1), PF(N)). The communication session 316 can include communications with one or more servers 320, such as a DNS (Domain Name System) server 322, a mail server 324, and/or other servers 326. For the embodiment depicted, forward packet flows are shown as odd numbered packet flows (PF1 . . . PF(N−1)), and return packet flows are shown as even numbered packet flows (PF2 . . . PF(N)), where N is assumed to be an even number.

The packet flows for the session 316 are monitored by the network application management system 330. This system 330 includes a number of different modules including session monitor and flow control module 332, session packet analyzer 333, application detector 340, dynamic signature generator 350, new application identification module 351, signature database 342, and application signature controller 344. The operation of this system 330 is now described in more detail. It is also noted that that application signature controller 344 is configured to manage, coordinate, and control the operations of the various modules and components within the network application management system 330.

A session monitor and flow control module 332 monitors and controls communication sessions and their respective packet flows for devices communicating within a network communication system to which the system 330 is connected. With respect to device 302, the session monitor and flow control module 332 receives the forward flows from the device 302 and sends these forward flows to the servers 320. The session monitor and flow control module 332 also receives return flows from servers 320 and sends these return flows back to the device 302. The session monitor sends packets associated with the monitored communication session to the session packet analyzer 333. The session monitor and flow control module 332 would similarly monitor the flows to and from devices 312 and 314, as well as other devices connected for monitoring to the network application management system 330.

The session packet analyzer 333 analyzes monitored packets and extracts application level information, as well as other desired information, from header fields, protocol fields, content fields, and/or other desired fields within the monitored packets. For example, application level network information 335 can be analyzed and extracted from the session packets, such as for example, OSI (Open System Interconnection) Layer 7 (e.g., L7: application layer) content extracted from the session packets. Examples of application level information includes DNS request information 336, SSL (Secure Socket Layer) certificate field information 337, HTTP (Hyper-Text Transport Protocol) header information 338, and/or other application level information 339. Other information 334 can also be analyzed and extracted from the session packets, if desired. For example, OSI (Open System Interconnection) layer content from mid-level OSI layers (e.g., L5: session layer, L6: presentation layer) and/or content from lower level OSI layers (e.g., L1: physical layer, L2: data link layer, L3: network layer, L4: transport layer) can be extracted from the session packets, as desired. Device type, hardware, operating system and/or other information can also be obtained and utilized as application related information. After application level information and other desired information is extracted from monitored session packets, the session packet analyzer 333 sends the extracted information 360, including application level information 335 as well as any desired additional information, to the application detector 340.

It is noted that the extracted application level information 335 is not simply a bit pattern within a stream of monitored packets. Rather, the extracted application level information 335 includes application level information that is obtained by unpacking encapsulations for protocols and tunneled protocols used with respect to monitored packets in order to find application level information (e.g., L7 application data). Such protocol encapsulations that can be unpacked include, for example, TCP (Transmission Control Protocol), IP (Internet Protocol), GTP (General Packet Radio Service (GPRS) tunneling protocol), HTTP (Hypertext Transport Protocol), and/or other packet communication protocols. The session packet analyzer 333, therefore, can unpack packet communication protocols to obtain application level information encapsulated within the network packets. Further, the session packet analyzer 333 is configured to apply fixed and/or dynamic pattern offsets in order to obtain the application level information 335 from monitored packets. As described herein, this extracted application level information 335 is used by the application detector 340 to identify applications rather than performing detection by blindly matching streams of bits against known bit patterns.

The application detector 340 compares the extracted information 360, including the application level information 35, with signatures stored in a signature database 342 to detect known applications. As described herein, the signature database 342 includes both known signatures 341 associated with previously known applications and dynamic signatures 343 associated with new unknown applications for which dynamic signatures are generated. If a match is found in signature database 342, detection of the known application is reported by the application detector 340 to the application signature controller 344. If no match is found, then the application detector 340 reports to the application signature controller 344 that an unknown application has been detected within the monitored session. The application signature controller 344 then initiates operation of the dynamic signature generator 350.

The TABLE below provides one example embodiment for application signatures stored within the signature database 342. For this embodiment, the stored application signatures include a collection of data patterns (P1, P2 . . . P(N)) associated with different match categories (FIELD1, FIELD2 . . . FIELD(N)) along with an application signature identifier (S1, S2, . . . S(N)) and application identification information such as a name (NAME1, NAME2 . . . NAME(N)) or other desired application information. An application recognition match can be determined to have been made if the extracted information 360 matches a threshold number of data patterns for a stored application signature.

TABLE

EXAMPLE STORED APPLICATION SIGNATURE DATA

| SIGNATURE ID | APP INFO | MATCH FIELD1 | MATCH FIELD2 | ... | MATCH FIELD(N) |
|---|---|---|---|---|---|
| S1 | NAME1 | S1-P1 | S1-P2 | ... | S1-P(N) |
| S2 | NAME2 | S2-P1 | S2-P2 | ... | S2-P(N) |
| ... | ... | ... | ... | ... | ... |
| S(N) | NAME(N) | S(N)-P1 | S(N)-P2 | ... | S(N)-P(N) |

The dynamic signature generator 350 operates to generate dynamic application signatures for unknown applications. In particular, the dynamic signature generator 350 analyzes the extracted information 360, including application level information 335 as well as any desired additional information, to generate one or more data patterns. If enough unique application information has been obtained so that signature patterns can be generated for the unknown application (e.g., level of unique application level information exceeds a predetermined threshold), the module 350 generates a new dynamic application signature 353 for the previously unknown application. The new dynamic application signature 353 along with associated application identification information is then stored as a dynamic signature 343 in the signature database 342. It is also noted that new signature data 354 for the new dynamic signature 353 can be forwarded to external systems, and signature updates 356 can be received and stored in the signature database 342 as an additional known signature 341, as described in more detail below with respect to the embodiments of FIGS. 5-7. It is also noted that if a new dynamic application signature cannot be generated for an unknown application (e.g., lack of sufficient unique extracted information), then a notification can be provided to a user, as described in more detail below.

The new application identification module 351 can be utilized to obtain additional identification information for a previously unknown application. The module 351 receives information from the dynamic signature generator 350 about a new application for which a dynamic signature is being generated. The module 351 can then communicate with external network-accessible resources 352 to facilitate the identification of the unknown application. The application level information, as well as other information, can be used to identify possible external resources where application information can be obtained. For example, application level information, such as target information from DNS request packets and/or certificate information within SSL packets, can provide information concerning a website, application store, and/or other network-accessible resource where information about the unknown application can be obtained. Other application level information can also be utilized to identify external network-accessible resources where potential application identification information may be found. Once an external resource is identified, the module 351 can access a website, application store, and/or other network-accessible resource to gather user-friendly information about the unknown application. This user-friendly application information can then be provided back to the dynamic signature generator 350 for storage as part of the information for the dynamic application signature 353. In addition, this application information can be provide to a user through the user interface 346 to facilitate understanding of the newly detected application. For example, instead of seeing a combination of extracted information such as port(s), domain names, user-agents (e.g., when supplied for HTTP packets), URI (Uniform Resource Identifier, when supplied for HTTP packets), SSL certificate information (when available), and/or any other application level information or identifiers that can be collected from packet flows between communicating network entities, the user can be displayed more meaningful and user-friendly information, such as "[DEVICE TYPE]::[OS TYPE]::[APPLICATION NAME]" (e.g., Mobile Device::Android::Angry Birds). Other variations and user-friendly information could also be provided.

If user input or reporting is desired, the application signature controller 344 can utilize the user interface 346 to communicate with external users, such as a network communications manager. For example, when the application detector 340 finds a match to a known application signature, the application signature controller 344 can communicate information associated with the detected application to the external user through the user interface 346. Similarly, when an unknown application is detected, the application signature controller 344 can communicate information obtained about the new application to the external user through the user interface 346. For known and/or previously unknown applications, the user can then be allowed to make decisions concerning operational parameters to be associated with the detected application operating within the network communication system. For example, the user can control packet priority, bandwidth usage, and/or other parameters for packets flows associated with the application. Further, the user could disallow use of the application, as well. The application related policy parameters can be stored as application policy settings 348, which are used in part to determine how the session monitor and flow control module 332 manages and controls packet flows being monitored within the network communication system. It is further noted that the user interface 346 can be used to allow a user to set up automated application policies that can be applied to known or newly detected applications without requiring further user intervention for future detected applications. For example, newly identified applications could have policies applied that automatically limit bandwidth usage as a default parameter to avoid the danger that a newly introduced application could overload the network communication system. Other default and/or automated parameters could also be utilized, as desired.

As indicated above, the application policy settings 348 are used to determine how the session monitor and flow control module 332 manages and controls packet flows associated with known and new applications operating within the network communication system. For example, if the bandwidth usage of a particular application is to be limited or prioritized based upon its policy settings, the module 332 will implement these policy settings by adjusting the packet flows for communication sessions associated with that particular application.

As described above, the session packet analyzer 333 unpacks known transport protocols (e.g., HTTP) for monitored packets and collects application level information. This application level information 335 is used by the application signature detector 340 to detect applications based on application signatures stored in the signature database 342. If a match is found, application identification information is provided to a user through the user interface 346. If no match is found, then the dynamic signature generator 350 analyzes the extracted information 360, including the application level information 335, to determine if enough unique data points for the flow have been detected such that the flow can be detected again. If so, then a new dynamic application signature 353 is created and stored in the signature database 342. The user is then provided information concerning the new dynamically detected application and any associated identification information. The user can then choose to create a rule filter for the new application that will cause actions to be taken to modify the transport of that flow when a further flow matches the dynamic signature stored for the new application. These modifications can include, for example, forwarding rules for the flow, blocking the flow, rate shaping the flow, rate limiting the flow, and/or any other desired modification to the flow. If not enough unique data points are detected by the dynamic signature generator 350, an indication is provided to the user that an unknown application has been detected but an application signature could not be generated. As further indicated above, new signature data 354 for the dynamic application signature 353 can be sent back to a central server or system where the data can be analyzed and turned into permanent static signature. The permanent static signature can then be provide back as a signature update 356 that will supersede the dynamic application signature stored in the signature database 342. In this way, the system 330 and similar systems can be used as a network of devices all helping each other to better detect applications.

Figure 4:
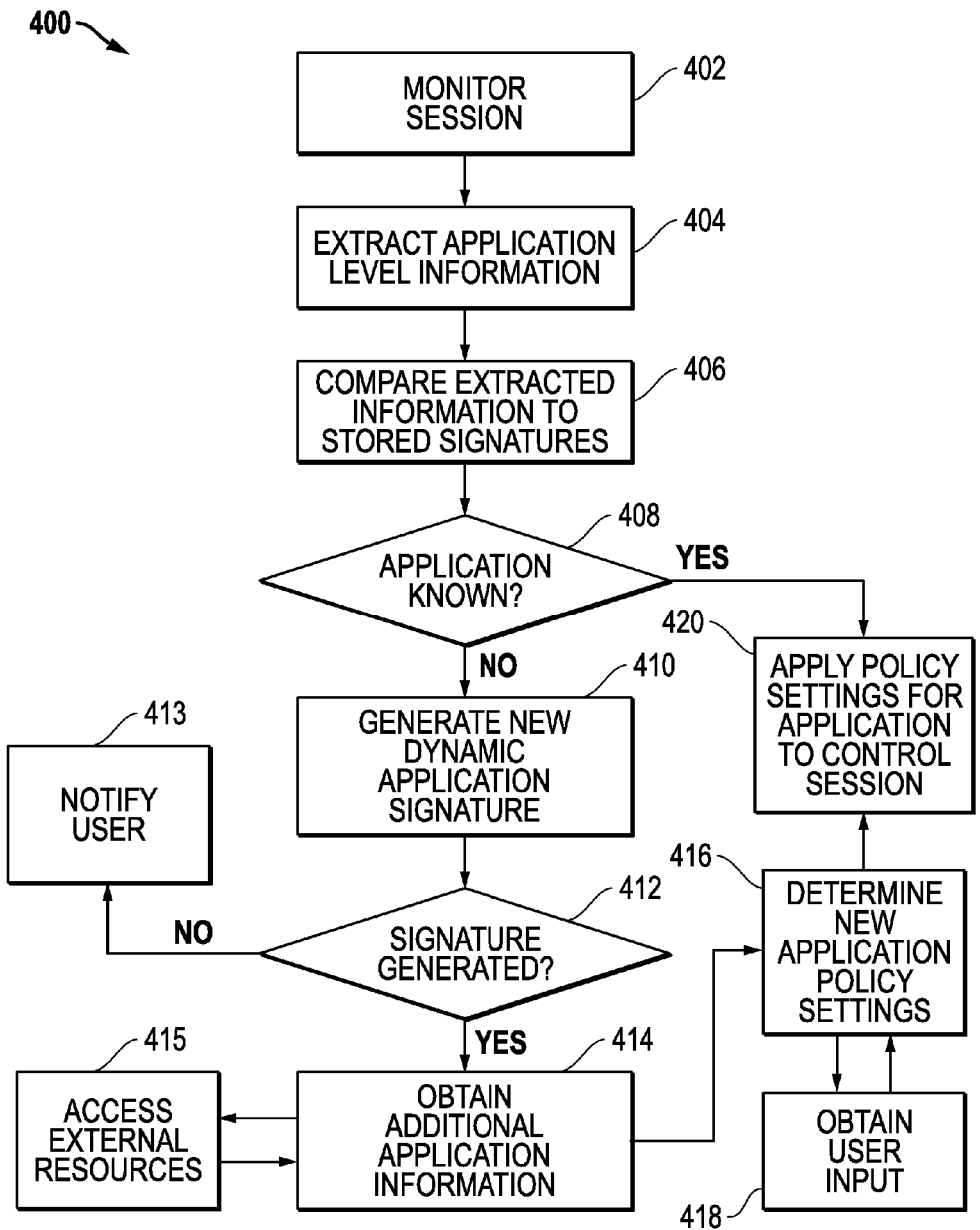
FIG. 4 is a process flow diagram of an embodiment for identifying unknown applications and generating dynamic application signatures for unknown applications using application level information.

FIG. 4 is a process flow diagram of an embodiment 400 for identifying unknown applications and generating new dynamic application signatures using application level information. In block 402, a communication session is monitored including its respective packet flows. In block 404, application level information is extracted from the packets associated with the communication session. As indicated above, mid-level and lower level information can also be extracted, if desired. In block 406, the extracted application level and other desired information is compared to stored application signatures. In block 408, a determination is then made whether or not the extracted information matches an application signature already stored in the signature database 342 as a known application 341 or a previously generated dynamic signature 343. If a match is found and the determination is "YES" in block 408, flow passes to block 420 where policy settings for the detected application are applied to control the communication session. If a match is not found and the determination is "NO" in block 408, flow passes to block 410 where an attempt is made to generate a dynamic signature for the unknown application. In block 412, a determination is made whether or not a dynamic signature was able to be generated. If "NO," then flow passes to block 413 where the user can be notified that an unknown application was detected but a signature was not able to be generated. If "YES," then flow passes to block 414 where additional application information is obtained. For example, external resources can be accessed in block 415 to obtain this additional application identification information. Next, in block 416, policy settings for the new application can be determined, and user input can be obtained in block 418 as part of this determination, if desired. Flow then passes to block 420 where policy settings for the detected application are applied to control the communication session. It is noted that different and/or additional process steps could also be utilized, as desired, while still generating dynamic application signatures for new applications identified as operating within a network communication system.

Figure 5:
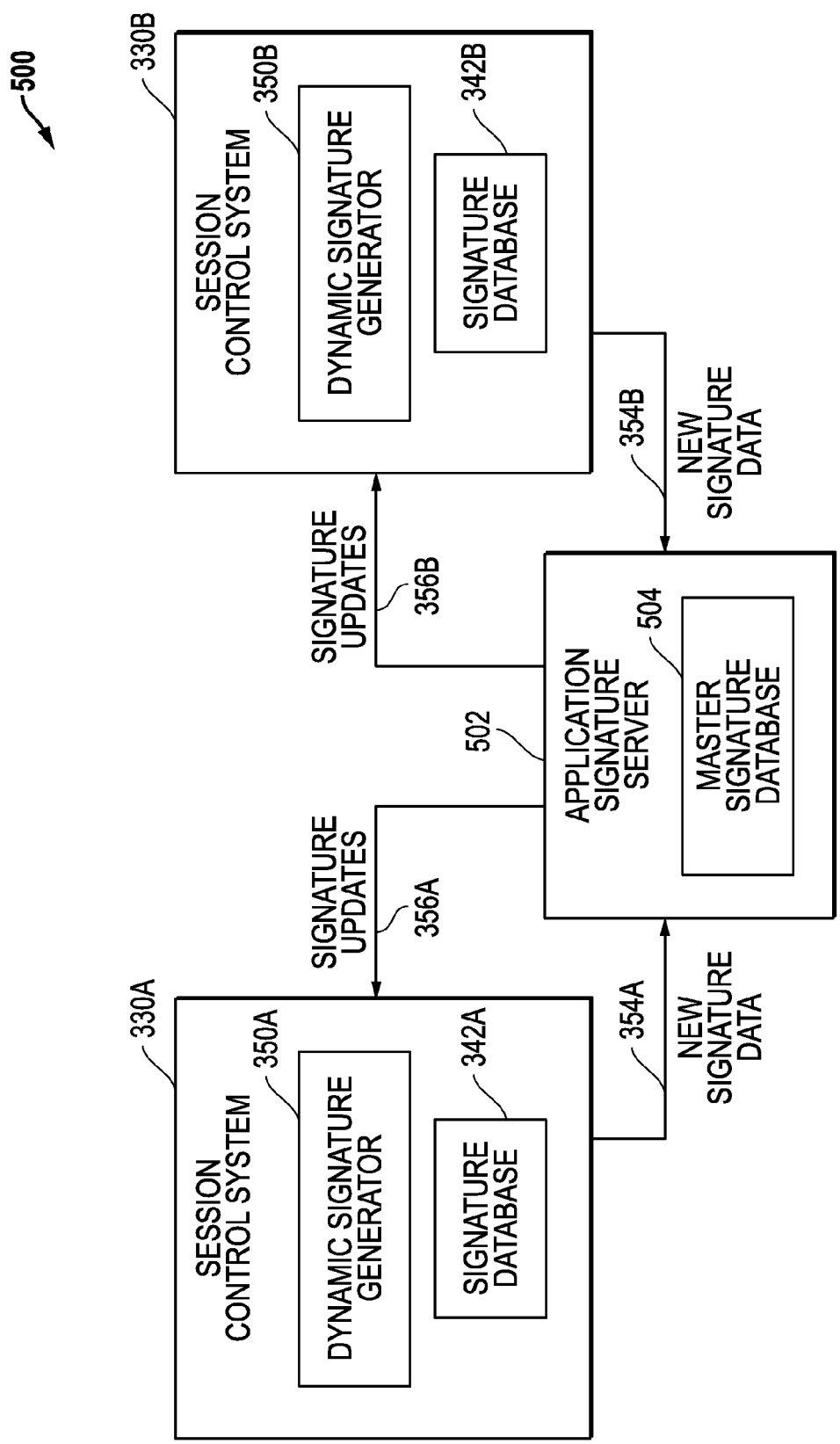
FIG. 5 is a block diagram of an example embodiment that utilizes a centralized master signature database in additional to local signature databases.
Figure 6:
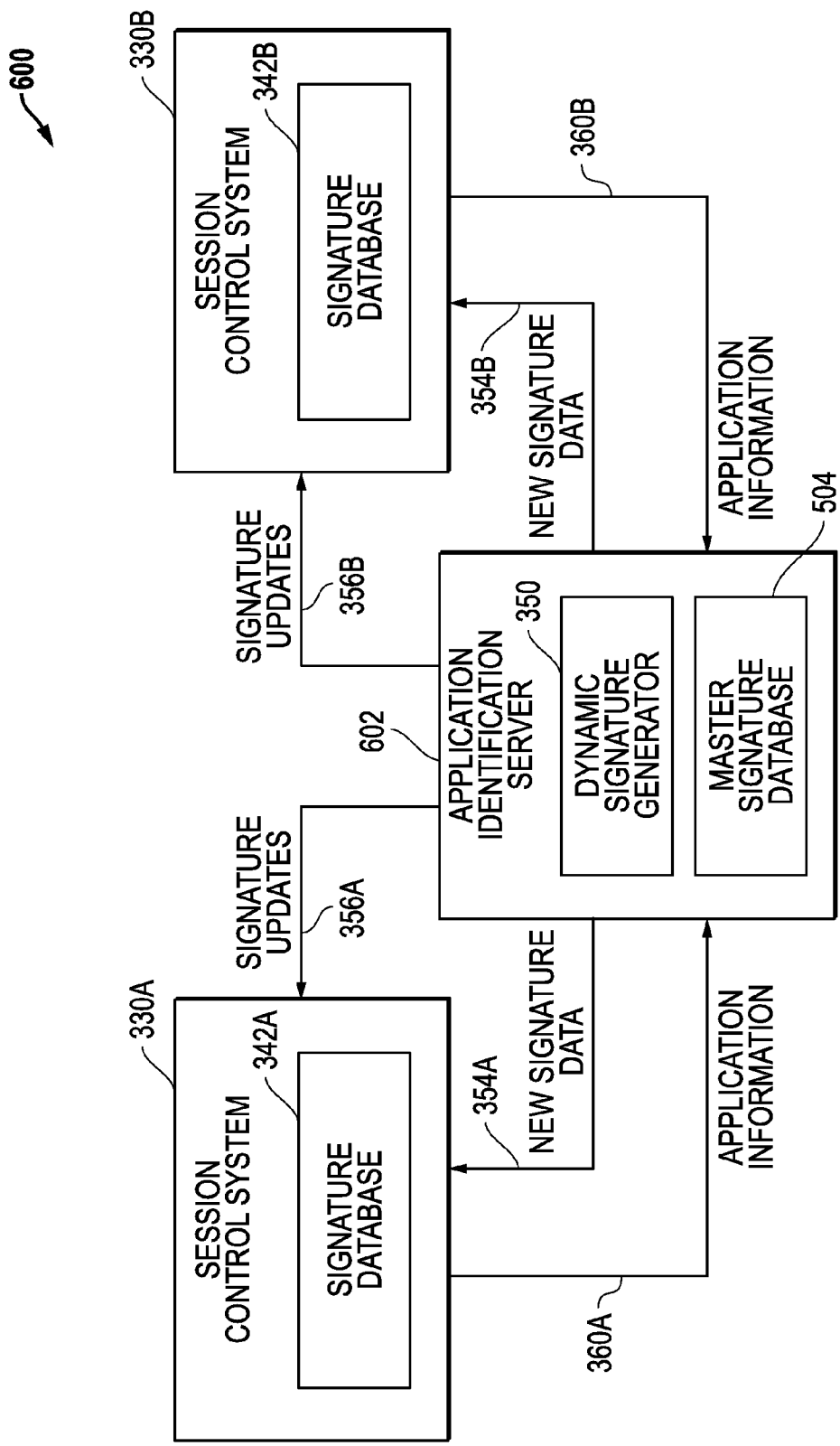
FIG. 6 is a block diagram of an example embodiment for centralized generation of new application signatures and for the use of a centralized master signature database.
Figure 7:
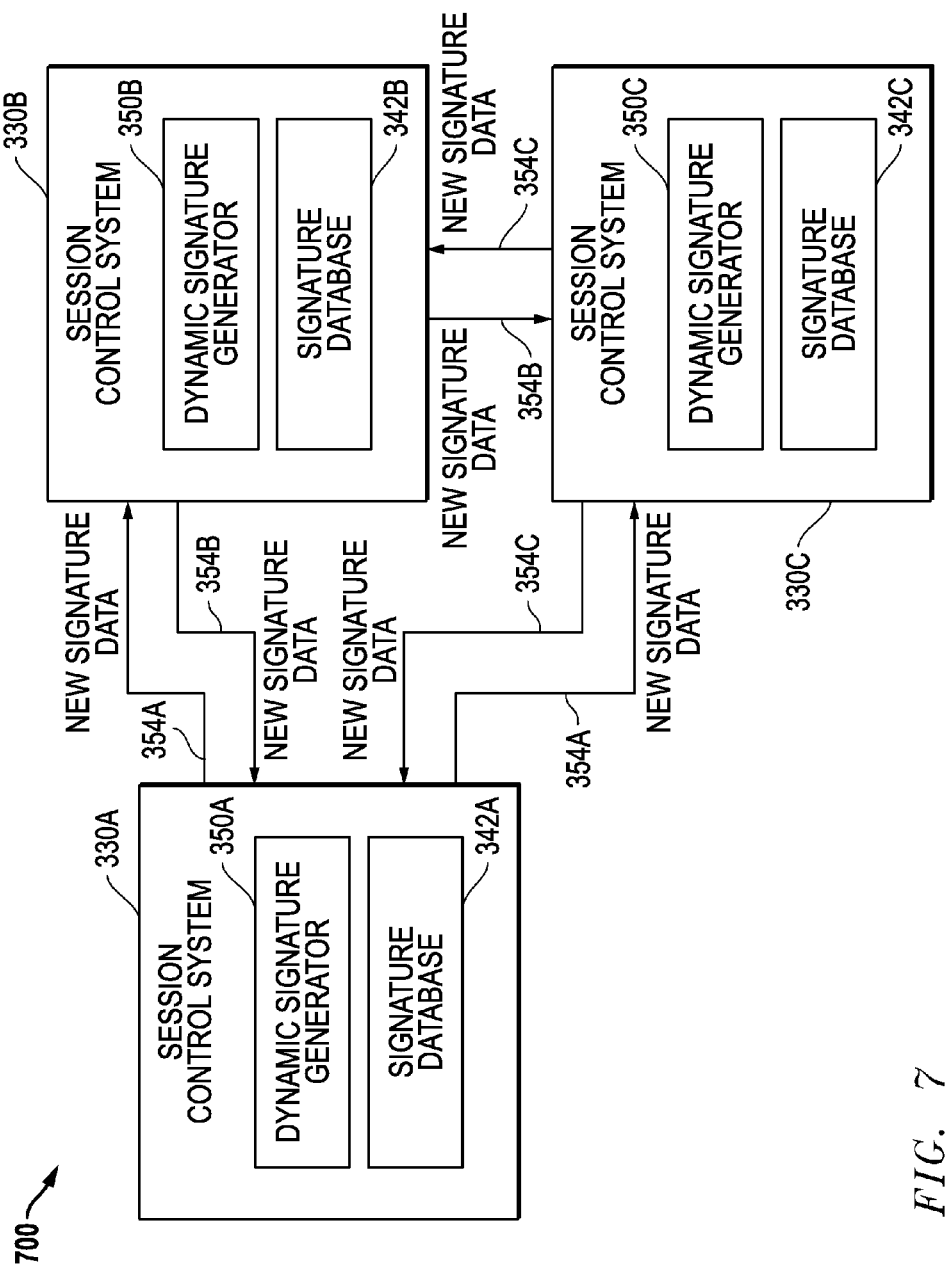
FIG. 7 is a block diagram of an example embodiment for local storage of application signatures without a centralized master signature database.

FIGS. 5-7 provide example embodiments for architecture implementations that manage the generation, storage, and updating of application signatures in an environment including multiple interconnected systems. FIG. 5 provides an example embodiment for use of a master signature database in additional to local signature databases. FIG. 6 provides an example embodiment for centralized generation of new application signatures and for the use of a master signature database. FIG. 7 provides an example embodiment for local storage of application signatures without a centralized master signature database. Other variations and combinations could be implemented as desired.

Looking now to FIG. 5, a block diagram is provided of an example embodiment 500 for use of a master signature database 504 in additional to local signature databases 342A/342B. For the embodiment 500, two network application management systems 330A and 330B are depicted. As described above, the systems 330A/330B include dynamic signature generators 350A/305B and signature databases 342A/342B, respectively, in addition to other operational modules. When new signatures and related information for newly identified applications are generated by system 330A, new signature data 354A for this newly identified application is provided to application signature server 502 so that it can be stored in the master signature database 504. Similarly, when new signatures and related information for newly identified applications are generated by system 330B, new signature data 354B for this newly identified application is provided to application signature server 502 so that it can be stored in the master signature database 504. It is also noted that the application signature server 502 can be configured to provide signature updates 356A/356B to the systems 330A/330B, respectively. As such, when new signature data 354A is received from system 330A, it can be provided as an update 356B to system 330B. Similarly, when new signature data 354B is received from system 330B, it can be provided as an update 356A to system 330A. Further, these updates 356A/356B can be automatically pushed to systems 330A/330B on a periodic basis over time, or these signature updates 356A/356B can be provided to systems 330A/330B when update requests are sent by these systems 330A/330B. Other update procedures and variations could also be implemented as desired. In addition to systems 330A/330B, it is further noted that the application signatures from the master signature database 504 could also be provided to and used by any of a wide variety of other systems, as desired, where it is advantageous to have the ability to identify applications.

FIG. 6 is a block diagram of an example embodiment 600 for centralized generation of new application signatures and for the use of a master signature database 504. In contrast to embodiment 500, a centralized dynamic signature generator 350 is utilized to generate new application signatures based upon application data 360A/360B, including application level information as well as other desired information, provided by the systems 330A/330B. In particular, when a signature for a new application does not match signatures within the local signature databases 342A/342B, the systems 330A/330B will send the relevant application data 360A/360B to the application identification server 602. The application identification server 602 then utilizes this data, as described above, to generate a new dynamic application signature for the unknown application using the dynamic signature generator 350. New application signatures 354A/354B can then be stored in the master signature database 504 and can provided back to the system 330A or system 330B that requested the generation of a new signature for a detected application. Further, as described above, signature updates 356A/356B can also be provided to the systems 330A/330B so that local signature databases 342A/342B can be updated to included newly generated signatures.

FIG. 7 is a block diagram of an example embodiment 700 for local storage of application signatures without a centralized master signature database. In contrast to embodiment 500, the systems 330A/330B/330C store application signatures within local signature databases 342A/342B/342C without utilizing a centralized master signature database. For this embodiment, each system 330A/330B/330C is configured to provide new signatures to the other systems 330A/330B/330C. For example, system 330A can provide new signature data 354A that it generates using its dynamic signature generator 350A to the other systems 330B/330C. Similarly, system 330B can provide new signature data 354B that it generates using its dynamic signature generator 350B to the other systems 330A/330C. And system 330C can provide new signature data 354C that it generates using its dynamic signature generator 350C to the other systems 330A/330B. As further noted above, these signature updates can be provided periodically, can be provided based upon update requests, and/or can be provided using other update procedures, as desired.

It is noted that for some embodiments, one of the network application management system 330A/330B/330C can be designated as having the master signature database. In such an embodiment, the other signature databases are treated as local databases and would be updated using signatures stored within this master signature database. As such, the network application management system selected to store the master signature database essentially becomes the application signature server 502 in embodiment 500.

It is further noted that with respect to the embodiments describe herein signature updates to signature databases can include signatures that update or supersede dynamic signatures generated and/or stored in signature databases. For example, a network application management system 330 can be configured by a user to report dynamic application signatures back to a centralized control system where the dynamic application signatures can be analyzed by additional systems and/or technicians to generate updated signatures. These updated signatures can then be provided back to the network application management system 330 as an update that supersedes the initial dynamic application signature. Other variations can also be implemented.

It is noted that the operational blocks and modules described herein can be implemented using hardware, software or a combination of hardware and software, as desired. In addition, integrated circuits, discrete circuits or a combination of discrete and integrated circuits can be used, as desired, that are configured to perform the functionality described. Further, programmable integrated circuitry can also be used, such as FPGAs (field programmable gate arrays), ASICs (application specific integrated circuits), and/or other programmable integrated circuitry. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, programmable circuitry (e.g., FPGAs), and/or processors to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU, controller, microcontroller, processor, microprocessor, or other suitable processing circuitry.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to control packet flows in a network communication system, comprising:
   receiving network packets associated with one or more flows for one or more network communication sessions between network devices and network servers within a packet network communication system;
   extracting application level information from the received network packets by unpacking one or more communication protocols associated with the network packets to obtain application level information encapsulated within the network packets;
   determining if the extracted application level information matches known application signatures stored in a signature database;
   if a match is found, controlling the one or more flows of network packets based upon application policy settings for the known application signature;
   if no match is found, then performing the additional steps of:
      generating a dynamic application signature representing a new application using the extracted application level information;
      storing the dynamic application signature in the signature database;
      accessing at least one of an application website or an application store as an external network-accessible resource to obtain additional application identification information for the new application;
      displaying application information for the new application including the additional application identification information to a user though a user interface;
      receiving operational parameters for the new application from the user through the user interface;
      storing the operational parameters as new application policy settings for the dynamic application signature representing the new application; and
      controlling the one or more flows of network packets based upon the new application policy settings for the dynamic application signature.

2. The method of claim 1, wherein the application level information comprises OSI (Open Systems Interconnect) layer seven (L7) information.

3. The method of claim 2, wherein the L7 information comprises information from at least one of a DNS (Domain Name System) request, an SSL (Secure Socket Layer) certificate header, or an HTTP (Hyper-Text Transport Protocol) header.

4. The method of claim 1, wherein the application information displayed to the user comprises a device type, an operating system type, and an application name.

5. The method of claim 1, wherein the new application policy settings for the new application comprise at least one of packet priority or bandwidth usage.

6. The method of claim 1, further comprising receiving application signature updates from an external source and storing the application signature updates within the signature database.

7. The method of claim 1, wherein if a match is not found, the method further comprises communicating the dynamic application signature to a central application signature server.

8. The method of claim 7, further comprising receiving an updated application signature for the dynamic application signature from the central application signature server and replacing the dynamic application signature with the updated application signature within the signature database.

9. The method of claim 1, wherein if no match is found, the method further comprises communicating a signature generation request to a signature generation server, performing the generating step on the signature generation server, and receiving the dynamic application signature from the signature generation server.

10. The method of claim 1, wherein if no match is found, the method further comprises generating the dynamic application signature only if the extracted application level information includes a level of unique application information that exceeds a predetermined threshold.

11. The method of claim 1, wherein the known application signatures and the dynamic application signature comprise a plurality of different match patterns, each match pattern at least in part including application level information.

12. A network system to control packet flows in a network communication system, comprising:
   a signature database configured to store application signatures;
   a user interface;
   one or more processors configured to execute instructions stored in one or more non-transitory tangible computer readable mediums to cause the one or more processors to:
      receive network packets associated with one or more flows for a network communication sessions between network devices and network servers within a packet network communication system;
      unpack one or more communication protocols associated with the network packets to extract application level information encapsulated within the network packets;
      determine if the application level information matches known application signatures stored in the signature database;
      if a match is found, control the one or more flows of network packets based upon application policy settings for the known application signature; and
      if no match is found, generate a dynamic application signature representing a new application using the extracted application level information and store the dynamic application signature in the signature database; and also:
         access at least one of an application website or an application store as an external network-accessible resource to obtain additional application identification information for the new application;
         display application information for the new application including the additional application identification information to a user though the user interface;
         receive operational parameters for the new application from the user through the user interface;

store the operational parameters as new application policy settings for the dynamic application signature representing the new application; and control the one or more flows of network packets based upon the new application policy settings for the dynamic application signature.

13. The network system of claim 12, wherein the application level information comprises OSI (Open Systems Interconnect) layer seven (L7) information.

14. The network system of claim 13, wherein the L7 information comprises information from at least one of a DNS (Domain Name System) request, an SSL (Secure Socket Layer) certificate header, or an HTTP (Hyper-Text Transport Protocol) header.

15. The network system of claim 12, wherein the application information displayed to the user comprises a device type, an operating system type, and an application name.

16. The network system of claim 12, wherein the new application policy settings for the new application comprise at least one of packet priority or bandwidth usage.

17. The network system of claim 12, wherein the one or more processors are further configured to store application signature updates received from an external source in the signature database.

18. The network system of claim 12, wherein the one or more processors are further configured to communicate dynamic application signatures generated by the one or more processors to a central application signature server.

19. The network system of claim 18, wherein the one or more processors are further configured to replace dynamic application signatures stored within the signature database with updated application signatures received from the central application signature server.

20. The network system of claim 12, wherein the one or more processors are further configured to communicate a signature generation request to a signature generation server and to cause a dynamic application signature received from the signature generation server to be stored in the signature database.

21. The network system of claim 12, wherein the one or more processors are further configured to generate a dynamic application signature only if the extracted application level information includes a level of unique application information that exceeds a predetermined threshold.

22. The network system of claim 12, wherein the known application signatures and the dynamic application signature comprise a plurality of different match patterns, each match pattern at least in part including application level information.

23. A network system to control packet flows in a network communication system, comprising:
a signature database configured to store application signatures;
a user interface;
programmable integrated circuitry programmed to:
receive network packets associated with one or more flows for a network communication sessions between network devices and network servers within a packet network communication system;
unpack one or more communication protocols associated with the network packets to extract application level information encapsulated within the network packets;
determine if the application level information matches known application signatures stored in the signature database;
if a match is found, control the one or more flows of network packets based upon application policy settings for the known application signature; and
if no match is found, generate a dynamic application signature representing a new application using the extracted application level information and store the dynamic application signature in the signature database; and then:
access at least one of an application website or an application store as an external network-accessible resource to obtain additional application identification information for the new application;
display application information for the new application including the additional application identification information to a user though the user interface;
receive operational parameters for the new application from the user through the user interface;
store the operational parameters as new application policy settings for the dynamic application signature representing the new application; and
control the one or more flows of network packets based upon the new application policy settings for the dynamic application signature.

24. The network system of claim 23, wherein the programmable integrated circuitry comprises at least one of an FPGA (field programmable gate array) or an ASIC (application specific integrated circuit).

25. The network system of claim 23, wherein the application level information comprises OSI (Open Systems Interconnect) layer seven (L7) information.

26. The network system of claim 23, wherein the application information displayed to the user comprises a device type, an operating system type, and an application name.

27. The network system of claim 23, wherein the new application policy settings for the new application comprise at least one of packet priority or bandwidth usage.

28. The network system of claim 23, wherein the programmable integrated circuitry is further programmed to store application signature updates received from an external source in the signature database.

* * * * *